May 6, 1969  J. W. JONES  3,442,686
LOW PERMEABILITY TRANSPARENT PACKAGING FILMS
Filed March 13, 1964

- SEALABLE ORGANIC POLYMER
- GLASSY BARRIER OF INORGANIC MATERIAL.
- ORGANIC POLYMERIC BASE FILM

INVENTOR
JOHN WILLARD JONES

BY

ATTORNEY

United States Patent Office 3,442,686
Patented May 6, 1969

3,442,686
LOW PERMEABILITY TRANSPARENT
PACKAGING FILMS
John Willard Jones, Wilmington, Del., assignor to E. I.
du Pont de Nemours and Company, Wilmington, Del.,
a corporation of Delaware
Filed Mar. 13, 1964, Ser. No. 351,680
Int. Cl. B44d 1/14; C09d 3/66
U.S. Cl. 117—70        9 Claims

ABSTRACT OF THE DISCLOSURE

A composite film structure suitable as a packaging film consisting of (1) a flexible, transparent organic base sheet, e.g., polyethylene terephthalate film, having (2) a transparent, heat-sealable top coating of a film-forming organic polymer, e.g., polyethylene; and (3) an intermediate flexible, transparent gas and liquid barrier, glassy coating of an inorganic material such as a silicon oxide, said intermediate coating having a thickness within the range of from 0.02 to 2 microns.

---

Figure 1:
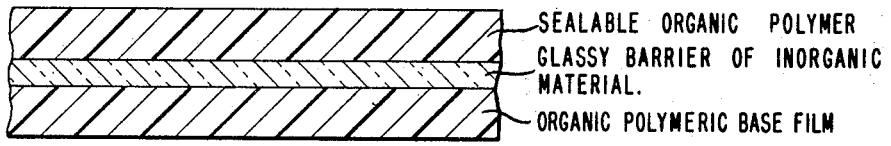

This invention relates to composite film structures, and more particularly to a flexible, sealable, transparent composite packaging film having extremely low permeability to gases and moisture.

Packaging films serve four principal functions: (1) afford mechanical protection to the contents; (2) protect the contents from external factors such as dirt and moisture; (3) provide closure for prevention of loss of contents; (4) improve appearance. In addition, transparent films not only improve appearance by affording an attractive display of contents, but also permit visual inspection of the contents without destruction or marring of the package. The utility of a packaging film can be greatly diminished if it is defective in any of the above functions, e.g., protection of the contents against moisture, or poor clarity which limits the ability to inspect the contents of the package.

Most transparent films afford some protection against moisture loss or gain and permeation of gases and essential liquids, but often this is not sufficient. Either the period which the contents can be kept (shelf life) may be short or thick layers are required which make the preparation of the package difficult and more costly. A partial solution to the problem has been the use of organic polymer coatings. The base film provides the strength and toughness while the coating, or combination of coatings, reduce the permeability of the structure and provide for sealing. However, even lower levels of permeation than those previously obtainable are desired.

An approach to the ultimate desideratum is hermetic packaging has been to laminate or coat metal foils. Obviously, these structures do not provide the desired transparency, and are not as rugged in many applications as organic films; for example, folding or bending usually damages the barrier properties of film-foil laminates or coated foils. These laminates are likewise more expensive than organic film structures.

In organic oxide coatings on organic film bases afford a structure with greatly enhanced barrier properties. These structures, however, are subject to damage by flexing and abrading, and are incapable of sealing without exceeding temperatures at which the base film is degraded or seriously distorted. Inorganic oxides have been used in the past as anchoring agents for topcoats or inks, but these oxide coatings, even in combination with the topcoats, have not provided the desired degree of impermeability. As anchoring agents oxides have been applied by two techniques: (1) brief contact with the vapors of an inorganic oxide in an evacuated vessel, and (2) precipitation by hydrolysis of inorganic salts and esters. These techniques afford little improvement in barrier properties and generally produce haze to impair optical qualities.

An object of this invention therefore is to provide a sealable, flexible transparent packaging film which has, initially and which retains under conditions of use, an extremely low permeability to gases and liquids. Another object is to provide a flexible transparent, heavy duty packaging film which retains an exceedingly low permeability to gases and liquids under packaging conditions which subject the film to high mechanical stresses. These and related objects will more clearly appear from the following detailed description.

The foregoing objects are realized by the composite film of this invention which, stated in brief, comprises a flexible, transparent, organic polymeric base film, having thereon an adherent intermediate transparent, flexible, highly gas- and liquid-impermeable, moisture resistant, continuous (unbroken) glassy coating of inorganic material, and a sealable, flexible, transparent top coating of organic polymeric material.

Figure 2:
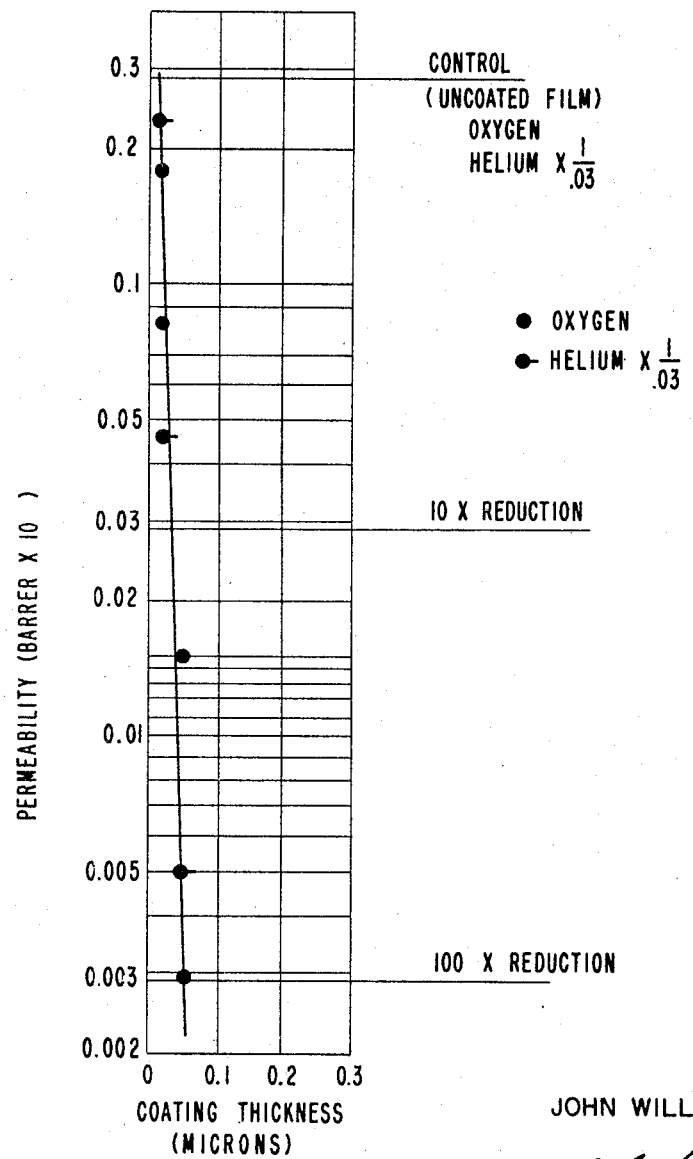

A typical composite film in accordance with this invention is illustrated in cross-section in the accompanying drawing wherein:

FIG. 1 illustrates in cross-section a typical composite film in accordance with the invention, and FIG. 2 is a graph illustrative of the relationship of permeability and coating thickness.

By the terms "glassy" and "glassy state," used herein to characterize the intermediate coating, is meant a coating which is in the state of a super-cooled liquid or glass, i.e., in a non-crystalline solid state in which the molecules of the coating composition are randomly arranged as in a liquid but are frozen in place, held by surrounding molecules. ("General Chemistry" by Linus Pauling (1949), page 255.)

The present invention encompasses a structure in which an inorganic glassy barrier composition is sandwiched between the organic base film, which is the principal strength component, and the sealable topcoat. As is seen hereinafter, this arrangement is critical in order to achieve the enhanced utility of the three components in combination. For example, we have found that the permeability is reduced to about one half if the organic surface is adjacent the high concentration of water vapor, rather than with the opposed relationship. The present invention utilizes this enhancement by providing an organic topcoat over the inorganic material in the sandwich structure.

The critical factors of the intermediate inorganic barrier layer are found to be the physical state, the thickness, the continuity, the resistance to the action of atmospheric moisture, and the location of the inorganic layer in the composite structure.

The first requirement is that the intermediate inorganic barrier coating be in the glassy state. The glassy state, as is known to those informed in the subject of the structure and behavior of solid materials, is an amorphous form of matter and has the nature of a supercooled liquid. Since its form is not determined by bonds which are highly critical as to length, it is more free to change its form and flow or bend under stress. Accordingly, in this invention the glassy state is essential to good durability on flexing. Moreover, flexible film structures, wherein the inorganic coating is substantially crystalline, are less effective barriers than those in which the coating is of a glassy, non-crystalline nature. This is in contrast to literature in the field which indicates that crystalline materials such as quartz are better barriers than the corresponding silica glasses. (See F. J. Norton, J. American Ceramic Society 36, 90 (1953).) While the reason for this surprising finding is not readily apparent, it is conjectured that it may be a result of the tendency of these crystalline layers to separate into discrete crystallities and cause the coating to be filled with numerous fissures. It is found in this invention that with some materials thinner coatings are noncrystalline, while above a certain thickness, approximately 2 microns, these same materials are crystalline. (This is many times the power of resolution of the X-ray technique employed.) A thickness of 2 microns also corresponds to the practical upper limit of thickness for flexing without damage to the barrier. Occasionally films having a coating of slightly more than 1 micron show poor permeability, but on alternate examination it is found that the coating is crystalline. Therefore, in addition to having the coating in the glassy, noncrystalline state, a barrier coating thicknesses of not more than 2 microns is required.

There is a minimum thickness, however, below which the inorganic barrier layer is ineffectual. This thickness is related to the requirement for continuity. Thicknesses of this layer less than 0.02 micron do not provide the marked increase in barrier properties afforded by the thicker (i.e., up to 2 microns) inorganic coatings, and this apparently for the reason, as evidenced by examination by techniques of electron microscopy, that it is not feasible to obtain a continuous (i.e. unbroken) coating of the inorganic coating in the glassy state at thicknesses less than 0.02 micron. Accordingly, the minimum thickness is fixed as that at which continuous layers may be obtained, this being 0.02 micron.

The barrier capacity of coatings as a function of thickness is illustrated in FIG. 2. The graph illustrates the permeability of oxygen and helium $$\left(\times \frac{1}{.03}\right)$$

as a function of the thickness of silicon monoxide on a 1 mil film of "Mylar"[1] polyester film. The silicon monoxide coatings were applied by evaporation of silicon monoxide with an electron beam heating in a vacuum enclosure, with thickness measured by procedures as hereinafter described. Permeability measurements are indicated in barrers, which units are $$\frac{\text{cc. (at STP)} \cdot \text{cm.}}{\text{cm.}^2 \cdot \text{sec.} \cdot \text{cm. Hg}} \times 10^{10}$$

measured by ASTM D-1434-58. From this figure it is seen that permeability of both gases increases inversely with coating thicknesses less than 0.03 micron and at a thickness of approximately 0.01 micron or less the permeability is that of the uncoated film. (It is to be observed that the indication of permeability of the uncoated film, the control, to helium has displaced from its true position on the graph by multiplication by the factor 1/.03 in order to show its relationship to the helium values on the plot.)

The continuous nature of the inorganic coatings may be described as substantially complete unbroken coverage of the entire surface by a glaze, rather than a dispersion or a proliferation of particulate matter. The techniques of low angle reflected light microscopy are capable of resolving coatings which are continuous and those which are not for the purpose of the present invention. Generally, it might be said that inorganic materials deposited on the surface by precipitation from a liquid are particulate in nature, and do not provide the superior barrier properties of the present invention. Likewise, coatings applied by brief contact with the vapors of the coating material, which may be adequate anchoring agents for inks and topcoats, are not generally dispersed uniformly so as to provide the benefits of the present invention.

Optical clarity, or transparency, is affected by the state of dispersion of the inorganic inner layer, as well as inherent opacity. This quality of the layer, however, is related to the continuity. Particulate materials, as is well known, scatter light and result in haze; therefore, if the layer has the nature of a glaze (glassy state) the conditions are most favorable for degree and nature of transparency as desired for packaging films.

The resistance to the action of atmospheric moisture is important in the present invention, although the composite film may not be destined for use as a moisture barrier film. For example, such material as borax and boric oxide readily form glassy coatings which meet all the other requirements, but by virtue of the action of atmospheric moisture, which under practical conditions is unavoidable, the inorganic layer permits gradual separation of the two outer layers.

The preferred method of preparation of this film structure utilizes the deposition of the inorganic material on an organic base film by evaporation in a vacuum enclosure, and subsequent application of the sealable topcoat by melt extrusion of the sealable material over the inorganic materials. The preferred base films are polyester films such as "Mylar"[2] oriented, heat-set polyester films, and oriented linear polypropylene films as well and from the perfluoro polymer from tetrafluoroethylene and hexafluoropropylene, polyvinyl fluoride and polyimides, for example from pyromellitic dianhydride and para-amino para phenylene oxide. Each of these films provides an optimum of mechanical strength and durability required, however, other films such as cellophane, nylon, cellulose acetate, and linear polyethylene may be employed. Special techniques as are known to those skilled in the art may be required with some of these, however. For example, cellulosic films are more difficult to coat in a vacuum evaporator due to the slow removal of moisture or plasticizing agents.

The preferred inorganic coatings are the oxides of silicon and aluminum. These can be readily deposited in transparent, flexible coatings in the glassy state, and have superior barrier properties. Silicon monoxide (SiO) or silicon dioxide ($SiO_2$) may be employed as the starting material for silicious coatings, aluminum trioxide ($Al_2O_3$) is employed for the alumina coatings. Zirconium oxide coatings are useful. Preferred coating techniques employ electrical resistance heating (tungsten filament), and, electron beam heating, particularly for the less easily vaporizable inorganic materials. Other inorganic compositions which are useful according to the present invention include those inorganic compounds which can be evaporated to yield water-insensitive, transparent, glassy coatings. Examples of various compounds which are workable include salts such as lead (ous) chloride ($PbCl_2$), silver chloride (AgCl), and calcium silicate, which is deposited as a mixed oxide. Silver chloride tends to become hazy on prolonged exposure to light, perhaps as a result of the photochemical formation of finely divided metallic silver. Likewise, as is known to the art, many of the materials which meet all the requirements are colored so this must be taken into consideration. For example, the oxides of iron result in yellow-red coatings. Therefore, care must be taken in selection of the material in order to obtain those compatible with end use.

The sealable topcoat may be of any of the materials known to the art for this function, and suitable for the particular method of sealing. In the present invention, however it has been found that the sealable topcoat over the inorganic compositions with the inorganic composition sandwiched between the base film and the sealable coating provides a synergistic effect on initial barrier properties.

For example, the total permeability of a composite film structure is given by the relationship (see R. Bhargava, et al., TAPPI, 40, 564 (1957)):

$$\frac{T}{P} = \frac{t_1}{P_1} + \frac{t_2}{P_2} + \frac{t_3}{P_3}$$

---

[1] Du Pont registered trademark.

[2] Du Pont registered trademark.

where

T = the total thickness of the composite film
P = the permeability of the composite film
$P_1$, $P_2$ and $P_3$ are the permeabilities of the individual component layers
$t_1$, $t_2$ and $t_3$ are the thickness of the individual components.

The synergism of the topcoat is revealed in that the permeability of the component is substantially lower than that predicted by this expression based upon the permeabilities and the thicknesses of the components. This effect is illustrated hereinafter in Examples 4–9.

The sealable topcoat for sealing by heat (which in practice is accomplished by a combination of heat and pressure) is preferably branched polyethylene; vinylidene chloride, nitrocellulose or polyamides. For solvent-activated seals nitrocellulose is a good example, with activation by means of ketones, such as methyl ethyl ketone and acetone, esters, such as butyl acetate and ethyl acetate, or the ether-alcohol mixtures as are known to the art. The pressure-sensitive adhesives may be selected from such compositions as those consisting primarily of copolymers of polyvinyl acetate.

The following specific examples will serve to further illustrate the principles and practices of this invention.

Example 1

A strip of 1 mil polyethylene terephthalate film (biaxially oriented) some 10 feet long and 6 inches wide was coated in a vacuum evaporator with silicon monoxide. The silicon monoxide was "pure Optical Coating Grade" obtained from the Coating Department of Kinney Vacuum Division of New York Air Brake Co., Camden, N.J. The film was mounted on a roll device which moved the film at about 3 inches per minute at a distance of about 12 inches above the evaporation sources. An 8 inch length of film was exposed at one time to the evaporation and the film was moved continuously. The silicon monoxide was crushed to a coarse powder and placed in a porcelain crucible with immersed 30-mil diameter tungsten wire coils. The vacuum measured with a Bayard-Alpert inverted type ionization gauge on the pumping system was approximately $5 \times 10^{-6}$ mm. of mercury (torr). The resulting coated film was thereafter on one side melt coated with "Alathon"[1] polyethylene resin to provide a continuous sealable coating over the silicon oxide coated surface.

The coating thicknesses were measured by X-ray fluorescence. Chromium radiation was used with a helium path and EDT analyzing crystal on a General Electric XRD-5 defractometer unit with a flow counter. The water vapor permeability was measured by the method fully described in U.S. Patent 2,147,180. Gas permeabilities were measured in a volumetric cell, according to ASTM D-1434–58.

The results are shown in Table I. The oxygen gas permeability was a factor of 30 lower than the base film and the water vapor permeability lower by a factor of more than 100.

Example 2

Oriented polypropylene film (0.8 mil, trademark "Profax" from Hercules Powder Co.) was treated in the same manner as described in Example 1. The results are given in Table I. The water vapor and oxygen permeabilities were reduced a factor of 8 over the base film.

TABLE I

|  | Example 1 | | | Example 2 | | |
|---|---|---|---|---|---|---|
|  | "Mylar" Polyester Film | | | Oriented Polypropylene | | |
|  | Base | SiO Coated | SiO/PE Coated | Base | SiO Coated | SiO/PE Coated |
| Nominal film thickness, mils | 1.0 |  |  | 0.8 |  |  |
| SiO coating, microns |  | 0.6 | 0.6 |  | 0.3 | 0.3 |
| PE coating, mils |  |  | 2.0 |  |  | 2.0 |
| Helium permeability [1] | 1.0 | 0.08 | 0.04 | 4.1 |  | 0.025 |
| H$_2$O permeability [2] | 130 |  | 1 | 40 |  | 5 |
| Heat seal peel, g./1¼ in |  | (3) | 1,200 |  | (3) | 1,000 |

[1] Permeability units:
$$\left(\frac{\text{cc. (STP) cm. (thick)}}{\text{cm.}^2 \text{ (area)} \cdot \text{sec.} \cdot \text{cm. Hg (pressure)}}\right) \times 10^{10}$$

[2] H$_2$O grams per 100 m.$^2$ per hour.

[3] Not sealable.

Example 3

Single sheets of 100 A "Mylar" polyester film (biaxially oriented polyethylene terephthalate film, one mil thickness; E. I. du Pont de Nemours and Co.) were mounted at the same distance from the source and coated as in Example 1, except that the film was not moved. The material to be evaporated was silica flour (Foote Minerals) or crushed "Alundum" (Al$_2$O$_3$ with SiO$_2$ binder; Norton Co.). The evaporated coating was transparent and reduced the permeation rate, as shown in Table II.

TABLE II

|  | SiO$_2$ | "Alundum" | Uncoated Control |
|---|---|---|---|
| Thickness, microns | 0.3 | 0.03 |  |
| O$_2$ permeability | 0.0002 | 0.0003 | 0.03 |
| He permeability | 0.02 | 0.03 | 1.0 |

"Saran" (vinylidene chloride/acrylonitrile copolymer; Dow Chemical Co.) coating was applied and the permeabilities found to be substantially lower than the above.

Examples 4–9

Base sheets of "Mylar" polyester film Type A, were coated wit hone and two coats, using the techniques of Example 1, to further illustrate the synergism of the composite structure; results are shown in Table III.

TABLE III

| Example | Top Coat | Thickness | | | Permeability of O$^2$ | |
|---|---|---|---|---|---|---|
|  |  | Total mils | SiO Coating, micron | Top Coat, mils | Measured [1] | Predicted [1,2] |
| 4 | None | 1.1 | 0.7 |  | 0.0012 |  |
| 5 | BPE [3] | 3.0 |  | 1.9 | 0.0018 | 0.0032 |
| 6 | None | 1.0 | 0.06 |  | 0.002 |  |
| 7 | BPE | 2.7 |  | 1.7 | 0.0023 | 0.0054 |
| 8 | None | 0.5 | 0.06 |  | 0.0044 |  |
| 9 | BPE | 2.3 |  | 1.8 | 0.006 | 0.020 |

[1] $\left(\frac{\text{cm.}^3 \cdot \text{cm. (thick)}}{\text{cm.}^2 \text{ (area)} \cdot \text{sec.} \cdot \text{cm. of Hg}}\right) \times 10^{10}$

[2] The permeation rate of polyethylene for oxygen is 1.1 to 4.7 (C. J. Major, "Mod. Plastics," July 1962, page 135); 2.0 was used in this calculation.

[3] Branched polyethylene "Alathon" (registered trademark of Du Pont) #1550 melt extruded over the inorganic coating.

Examples 10–13

Base sheets of "Mylar" polyester film, Types A and C, were coated with one and two coats as described in Example 1 and water vapor permeabilities were measured before and after flexing with the results shown in Table IV. It will be observed that the two-coated structure of

[1] Du Pont registered trademark.

this invention is significantly more durable than is an identical base sheet carrying only the barrier coating.

TABLE IV

| Example | Description | Thickness | | Water Vapor Permeability,[1] g./100 m.²/hr. | |
|---|---|---|---|---|---|
| | | Total mils | SiO Coat, microns | Unflexed | 20 Flexes[2] |
| 10 | 75 C "Mylar" | 0.7 | 0.1 | 14 | 57 |
| 11 | 75 C "Mylar" plus BPE top coat. | 2.6 | 0.08 | 7 | 11 |
| 12 | 100 A "Mylar" | 1.1 | 0.06 | 15 | 49 |
| 13 | 100 A "Mylar" plus BPE top coat. | 2.8 | 0.06 | 12 | 11 |

[1] Du Pont IPV method—see U.S.P. 2,147,180.
[2] Gelbo Flex Test (according to P. A. Gelber, et al., "Mod. Packaging," January 1952, page 125).

Example 14

Single sheets of 100 A "Mylar"[1] polyester film were coated with glassy, transparent, inorganic compositions by electron beam evaporation. The electron beam gun was operated at 500 watts power. The electrons had an energy of 5 to 20 kilovolts. The beam spot area was less than one quarter square inch. The chamber vacuum was $2 \times 10^{-6}$ torr. The target to film distance was 12 inches, and the target material was placed in a graphite boat. These inorganic coatings were coated with sealable topcoats as in Example 1, with substantially equivalent results. The results are shown in Table V.

TABLE V

| Evaporation Material | Source | Coating Thickness, microns | Permeability[1] | |
|---|---|---|---|---|
| | | | O₂ | He |
| MgO | Norton Magnesia Brick 12M | 0.2 |  | 0.16 |
| Al₂O₃ | Norton Alundum #4186 | 0.15 | 0.0018 | 0.04 |
| SiO₂ | Baker Purified Sand | 0.20 | 0.0014 | 0.7 |
| ZrO₂ | Norton Fuzed Stabilized Zirconite. | 1.6 | 0.01 | 0.4 |
| None |  |  | 0.03 | 1.0 |

[1] $\left(\frac{cc.\ (STP \cdot cm.}{cm.^2 \cdot sec. \cdot cm.\ of\ Hg}\right) \times 10^{10}$ Example 15

The base sheet is not limited to polyester or polypropylene. Films of other chemical compositions were coated as in Example 1. The base films were polyimide and a perfluoro polymer. The evaporated coating was transparent and reduced the permeation rate as shown in Table VI. A polyimide film, having an inorganic barrier layer, and a perfluoro topcoat, as shown in the table forms the basis for a helically wound pipe, with overlapping edges of the film sealed. Such tubing and pipe is useful for wide temperature ranges and is inert to most fluids.

A transparent inorganic-coated base film may be laminated to a spun-bonded, non-woven web according to this invention to provide a tear resistant flexible barrier structure. The transparency of the base film and the oxide barrier coat are important for the display of printing and decorative features imprinted on the non-woven web. Example 16 illustrates this utility.

TABLE VI

| Base Film | Thickness, mils | Coating | Thickness, microns | Permeability[1] | |
|---|---|---|---|---|---|
| | | | | O₂ | He |
| Polyimide[2] | 0.91 | None | | 0.06 | 2.4 |
| | | SiO | 0.25 | 0.005 | 0.27 |
| "Teflon" FEP[3] | 1.0 | None | | 3.5 | 44 |
| | | SiO | 0.18 | 0.62 | 5.5 |

[1] $\left(\frac{cc.\ (STP).\ cm.}{cm.^2 \cdot sec. \cdot cm.\ Hg}\right) \times 10^{10}$

[2] A polyimide film made from pyromellitic dianhydride and para amino para-phylene oxide.
[3] Registered trademark of Du Pont for its perfluoro polymer from tetrafluoroethylene and hexafluoropropylene.

[1] Du Pont registered trademark.

Example 16

A silicon monoxide coated 0.8 mil film of biaxially oriented polypropylene was combined in the nip of a melt coater with a 1 oz./yd.² spun-bonded web of linear polyethylene. The silicon monoxide coating faced the spun-bonded web and was adhered by means of a 0.5 mil melt of "Alathon" 1550 (manufactured by E. I. du Pont de Nemours & Co., Inc.). The lamination was carried out at 45 f.p.m. using a 1½" air gap, 330° C. melt temperature, 50° C. nip roll temperature, 40° C. quench roll temperature and a nip pressure of 250 lbs./in. of width. Subsequently the reverse side of the film was treated with an oxygen enriched propane-air flame for adhesion. Then it was melt coated with 1 mil of "Alathon" 16 at 40 f.p.m. A melt temperature of 330° C., air gap 1½", 105° C. nip roll temperature, 40° C. quench roll temperature and a nip pressure of 250 lbs./in. of width were utilized. The properties of this sample (No. 1) are shown in Table VII with those of a lamination made under the same conditions except that the polypropylene was replaced with a 0.5 biaxially oriented polyethylene terephthalate film (No. 2). Also included as a control is an aluminum foil/linear polyethylene spun-bonded web laminate with a similar structure.

TABLE VII.—SPUN-BONDED LAMINATES

| Number | 1 | 2 | 3 |
|---|---|---|---|
| Structure | (A) | (B) | (C) |
| Gage (mils) | 4.8 | 4.5 | 4.5 |
| Tensile (K p.s.i.) | 12.2/8.3 | 10.3/7.8 | 7.9/7.2 |
| Elong. (percent) | 38/42 | 30/49 | 49/34 |
| Modulus (K p.s.i.) | 146/105 | 175/137 | 204/185 |
| Tear (g.) | 122/176 | 150/179 | 504/510 |
| Mullen Burst (lbs.) | 82 | 156 | 81 |
| Pneu. Imp. (kg.-cm.) | 6.57 | 4.47 | 4.76 |
| O² Perm. (g./100 m.²/hr.): | | | |
| As is | 0.64 | 0.42 | 0.01 |
| After 20 flexes | 0.72 | 0.05 | 4.70 |

(A) = LPE/BPE/SiO/OPP/BPE
(B) = LPE/BPE/SiO/"Mylar"*/BPE
(C) = LPE/BPE/Al/BPE
LPE is linear polyethylene, 1 oz./sq. yd. spun-bonded fabric.
BPE is branched polyethylene, 0.5 mil film, to LPE. 1 mil topcoat.
OPP is oriented polypropylene, 0.8 mil film.
"Mylar"* is 0.5 mil film.
Al foil is 0.45 mil.
*Du Pont registered trademark.

We claim:
1. A composite flexible, transparent film structure comprising, in combination, a flexible, transparent, organic polymeric base film, an adherent, transparent, flexible, moisture resistant, glassy, continuous, substantially gas and liquid-impermeable intermediate coating of inorganic material on one surface of said base film, said coating having a thickness within the range of from 0.02 to 2 microns and a sealable, flexible, transparent adherent top coating of organic polymeric material on said intermediate coating.

2. The composite film structure of claim 1 wherein the inorganic material is an oxide of silicon.

3. The composite film structure of claim 1 wherein the organic material is an oxide of aluminum.

4. The composite film structure of claim 1 wherein said base film is polyester base film.

5. The composite film structure of claim 1 wherein said base film is polypropylene film.

6. The composite film structure of claim 1 wherein said top coating is polyethylene.

7. A composite flexible film structure comprising, in combination, a polyester base film, a continuous glassy, substantially gas—and liquid-impermeable intermediate coating of silicon monoxide on one surface of said base film, said coating having a thickness within the range of from 0.02 to 2 microns, and a heat sealable top coating of polyethylene on said intermediate coating.

8. A composite flexible film structure comprising, in combination, a polypropylene base film, a continuous glassy intermediate coating of silicon monoxide on one surface of said base film, said coating having a thickness within the range of from 0.02 to 2 microns, and a heat sealable top coating of polyethylene on said intermediate coating.

9. A composite flexible film structure comprising, in combination, a polyester base film, a continuous glassy intermediate coating of aluminum trioxide on one surface of said base film, said coating having a thickness within the range of from 0.02 to 2 microns, and a heat sealable top coating of polyethylene on said intermediate coating.

References Cited
UNITED STATES PATENTS

| | | | |
|---|---|---|---|
| 2,824,025 | 2/1958 | McIntyre | 117—138.8 |
| 2,943,955 | 7/1960 | Brill. | |
| 3,188,265 | 6/1965 | Charbonneau et al. | |

ALFRED L. LEAVITT, *Primary Examiner.*

J. H. NEWSOME, *Assistant Examiner.*

U.S. Cl. X.R.

117—72, 138.8, 161; 161—208, 231, 247